Nov. 29, 1960 H. E. COTTER 2,962,194
SPREADER APPARATUS
Filed Aug. 28, 1956
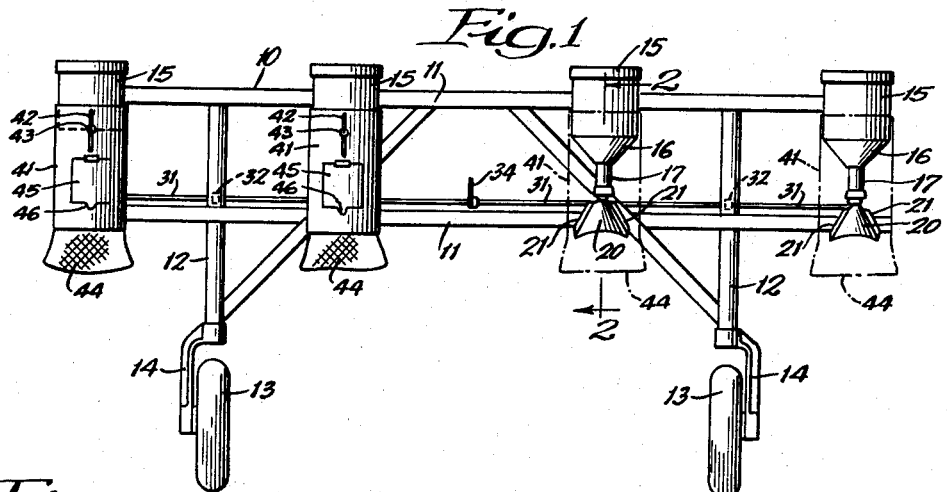
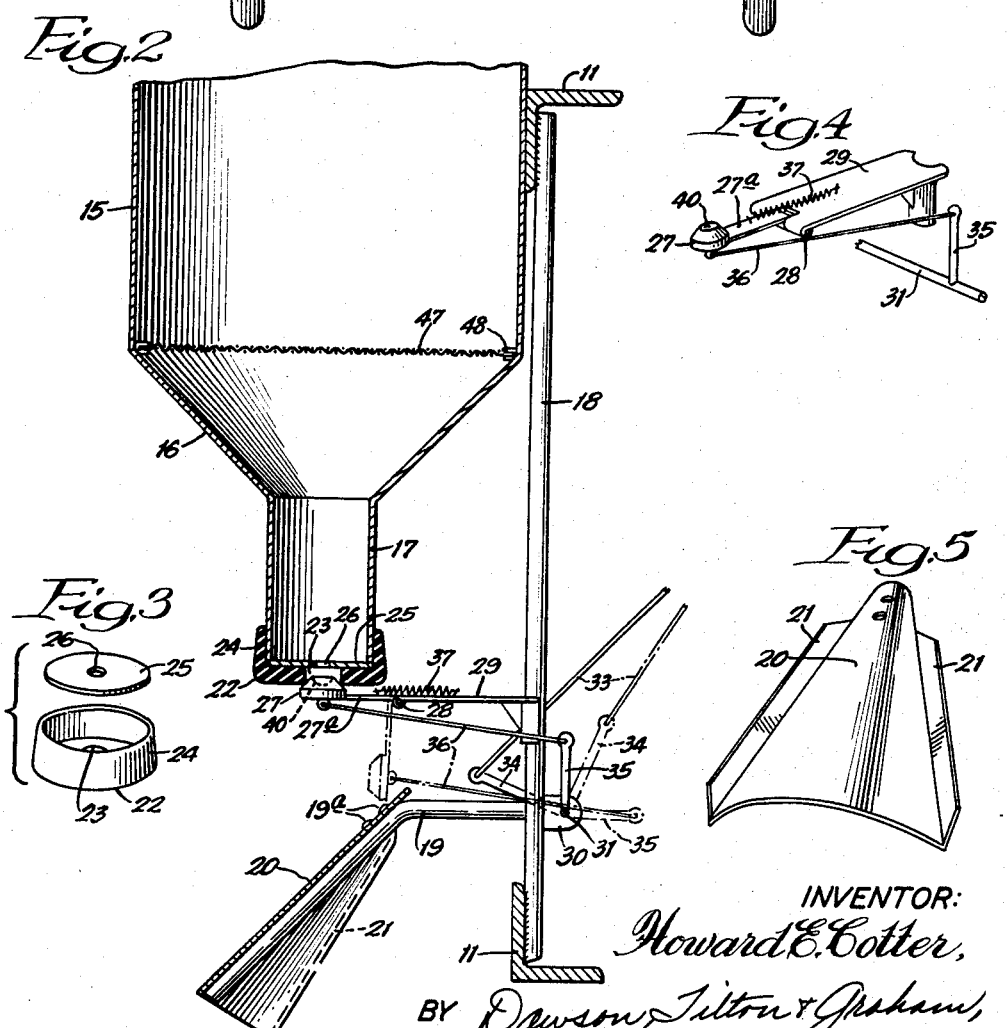
INVENTOR:
Howard E. Cotter,
BY Dawson, Tilton & Graham,
ATTORNEYS.

United States Patent Office 2,962,194
Patented Nov. 29, 1960

2,962,194

SPREADER APPARATUS

Howard E. Cotter, Flanagan, Ill.

Filed Aug. 28, 1956, Ser. No. 606,694

1 Claim. (Cl. 222—185)

This invention relates to an apparatus for spreading dry materials upon crops, weeds, etc., and more specifically, to a gravity flow apparatus particularly suitable for use as a legume seeder and granulated chemical applicator.

In a conventional spreader apparatus fine particles of dry chemical materials are distributed from hoppers by metering devices operatively connected with the axles upon which the apparatus is carried. Since the amount of chemical distributed depends principally upon the speed at which the apparatus is moved and the size of the particles carried in the hoppers, such an apparatus operates properly only when speed and particle size are carefully controlled. Often the apparatus is designed for applying or distributing a certain specific material and cannot be adjusted for efficient operation in connection with the dusting of other chemicals having different particle sizes. Furthermore, the moving parts of the metering mechanism are subject to wear and clogging and, for satisfactory operation, must be frequently lubricated and cleaned.

Therefore one of the main objects of the present invention is to overcome the defects and disadvantages of the present applicators and particularly those disadvantages mentioned above. Another object is to provide an applicator structure in which there are a minimum of moving parts and in which particles of dry material are directed under the influence of gravity against dispersing means adapted to evenly distribute the particles upon crops and the like. Another object is to provide a gravity flow applicator which may be easily and quickly adapted for distributing materials having different particle sizes and for varying the rate of distribution for any given dry material. A further object is to provide a gravity flow chemical applicator in which particles of dry material fall freely and are then deflected and uniformly distributed over a predetermined area. Another object is to provide a highly effective and adaptable apparatus for evenly distributing a variety of finely-divided dry materials, such as dry chemicals and fertilizers upon crops, soil, etc.

Other objects will appear from the specification and drawings in which:

Figure 1 is a rear elevation of an apparatus embodying the present invention; Fig. 2 is an enlarged broken sectional side view taken along line 2—2 of Fig. 1; Fig. 3 is a perspective view showing the components of the nozzle structure; Fig. 4 is a perspective view illustrating details of the valve structure; and Fig. 5 shows the deflector or dispersing means in perspective view.

In the embodiment of my invention as shown in the drawings, the numeral 10 generally designates a frame having horizontal and vertical frame members 11 and 12 respectively. Wheels 13 are connected to the depending vertical frame members by arms 14 and movably support the remainder of the applicator apparatus. The frame structure is entirely conventional and may be drawn by a tractor or any other suitable driving means.

Welded, or otherwise mounted upon upper horizontal member 11, are a plurality of uniformly spaced hoppers 15 for carrying finely divided dry material such as granulated insecticides, dry fertilizers, etc. Preferably, each of the hoppers has a tapered intermediate portion 16 and a tubular lower neck portion 17 of reduced diameter as shown most clearly in Fig. 2. While only four hoppers are shown mounted upon the frame, it will be understood that a greater or smaller number may be provided if desired.

A vertical member or bar 18 is rigidly secured at its upper and lower ends to the horizontal and parallel frame members 11 and extends downwardly adjacent each of the hoppers 15. As shown in Fig. 2, each vertical bar 18 extends downwardly below the lower end of the hopper and is provided with a deflector support arm 19 which extends towards the vertical axis of the hopper and then angles downwardly and rearwardly at a spaced distance directly therebelow. A semi-conical deflector 20 is mounted upon support arm 19 with its upper convex surface spaced below the neck of the hopper. In the illustration given, each deflector 20 is detachably mounted upon its respective support arm by screws 19a, or by any other suitable connecting means. Hence, each of the deflectors may be removed and replaced by similar deflectors of different size, depending on the nature of the chemical or other material to be distributed.

As illustrated most clearly in Figs. 2 and 5, each semi-conical deflector tapers upwardly and forwardly and is equipped with a pair of laterally extending deflector ridges or wings 21. These ridges project outwardly from diametrically opposing sides of the deflector and aid in insuring proper distribution of particles falling from hopper 15, as will be described shortly.

A resilient elastic cup 22 having a central opening 23 therein is snugly fitted upon the lower end of neck 17 to provide a nozzle for the discharge of granular or other finely divided material from hopper 15. Cup 22 may be formed of rubber or any other suitable resilient material and is equipped with an angular side wall 24 which frictionally engages the outer surface of the hopper neck for detachably securing the cup thereto. Interposed between the lowermost end of neck 17 and the bottom wall of cup 22 is a disc 25 having a central opening 26 in register with opening 23 of the cup. Hence particles moving downwardly within hopper 15 under the influence of gravity pass through aligned openings 26 and 23 and then fall downwardly upon the inclined deflector 20.

One important feature of the present invention lies in the fact that a plurality of discs 25 may be provided, each of the discs having the same diameter and differing only in the size of central opening 26. Because of their identical outer dimensions, the discs of the series may be interchangeably mounted within cap 22 for adjusting the rate of flow from hopper 15. By interchanging the discs an operator may easily vary the rate of discharge in accordance with the distribution requirements of the material carried within the hopper and the speed at which the apparatus is to be moved.

Below cup 22 is a tapered resilient stopper or valve member 27 adapted to sealingly engage the edge of the cup extending about opening 23. Valve member 27 may be formed of rubber or other suitable material and is carried by an arm 27a which is pivotally secured by pin 28 to one end of a valve member support bracket 29. The opposite or front end of the bracket may be welded to bar 18 in general horizontal alignment with the lowermost end of the hopper.

Each of the vertical bars 18 is provided with a forwardly projecting ear 30 which is disposed below the lower end of the hopper and which is apertured to rotatably receive a horizontal shaft 31. In Fig. 1 it will be seen that the shaft is also rotatably supported by brackets 32 mounted upon the vertical frame members 12. The shaft is rotated by movement of control wire or cable 33 which is operably connected to the shaft by means of control lever 34. A plurality of parallel valve operating levers 35 are mounted upon shaft 31 adjacent the respective hoppers, each of the levers 35 being disposed normal to the axis of the shaft and each having its free end operably connected to one of the valves 27 by any suitable linking means, such as a flexible wire connector 36. Therefore, when cable 33 is drawn forwardly, shaft 31 is rotated in a clockwise direction (Fig. 2) to pivot levers 35 and thereby simultaneously pivot all of the stoppers or valve members away from their respective cups. Springs 37 are provided adjacent pins 28 and extend between brackets 29 and arms 27a for biasing the valve members into closed position.

It is to be noted that the portion of each valve member or stopper 27 which is engageable with cup 22 is generally frusto-conical in configuration and that a recess 40 is provided at the top of each valve member. Therefore, when the resilient valve members are seated, the recess of each member will be positioned directly below opening 26 in disc 25 and will become filled with particles flowing downwardly through the apertured disc. Recesses 40 accumulate particles which would otherwise tend to wedge between the movable valve members and the cups as those members move into closed position, thereby insuring proper seating of the valve members.

In Fig. 1 it will be seen that each of the hoppers is equipped with a wind guard 41 which shields particles as they fall from the hopper upon the deflector therebelow and which thereby aids in achieving proper distribution of the particles or granules even on windy days. Each of the guards is provided with a vertical slot 42 which slidably receives the threaded shaft of bolt connection 43. The wind guard may therefore be vertically adjusted into the most suitable position, depending upon plant's height and wind condition. If desired, a fabric flap 44 may be secured to the lower edge of each guard to aid further in shielding the downwardly traveling particles.

To eliminate the need for removing the wind guard from the hoppers each time the apertured discs 25 are interchanged with discs having different hole sizes, I provide each guard with a hinged door 45 which may be swung open to expose the lower end of the hopper. Latching means, which may be in the form of spring clasp 46, are provided along the edge opposite the hinge of each door to engage the adjacent edge of the guard opening and to maintain the doors in closed position when the apparatus is in operation.

Referring to Fig. 2, it will be seen that each of the hoppers is equipped with a removable screen 47 having a rim 48 which seats against the inclined hopper wall adjacent the top of the inverted conical portion 16. The pores or openings in the screen are preferably smaller than the smallest opening in the set of discs 25, thereby preventing clogging of the disc openings by unusually large granules or seeds, or occasional foreign particles, which may be intermixed with the particles of material carried within the upper portion of the hopper.

In the operation of the apparatus a quantity of finely-divided material, such as dry granulated DDT, is placed in each of the hoppers 15 and the apparatus is positioned so that each of the hoppers is disposed above one of the rows of plants. As the apparatus is drawn forwardly, the tractor operator pulls cable 33 to unseat simultaneously all of the valve members 27 and to permit particles to flow from hoppers 15 under the influence of gravity onto semi-conical deflectors 20. In their free fall between disc openings 26 and the deflector plates, the chemical particles gain speed and upon striking the deflector are distributed uniformly over a predetermined area. To interrupt the flow of material, the operator simply releases cable 33 so that springs 37 can direct the valve members into sealing relation with perforate cups 22.

Except for the shutoff means, the applicator apparatus has no moving parts, thereby reducing the maintenance costs involved in operating the machine. Should cleaning of the apparatus become necessary, cups 22 and discs 25 may be easily removed to expose the interior of the hopper's lower end portion or neck 17.

As pointed out above, the rate of application is controlled by the size of the openings in discs 25. After determining the distribution requirements for a particular material and the speed at which the apparatus is to be drawn, an operator may easily select discs having openings of the proper size. Since the discs are interchangeable, the amount of material to be distributed over any given area may be easily controlled.

While I have disclosed my invention in considerable detail for purposes of illustration, it will be understood by those skilled in the art that many of these details may be varied considerably without departing from the spirit and the scope of the invention.

I claim:

In an apparatus for distributing finely-divided dry materials upon crops and the like, the combination comprising a frame, a hopper mounted on said frame and having a lower tubular neck portion terminating in an outlet opening, a resilient cup received on the lower end of said neck portion, said cup having resilient side walls frictionally engageable with the outer surface of said neck portion and providing a horizontally-extending bottom portion disposed across said neck outlet opening, a disc having an opening therethrough positioned beneath the lower end of said neck portion across said outlet opening and immediately above said bottom portion of said cup, said disc being supported by the horizontally-extending bottom portion of said cup, said horizontally-extending cup portion having an opening therein in alignment with the opening in said disc and with said neck outlet openig, said cup opening being larger than said disc opening but smaller than said neck outlet opening, an arm extending to a point below the opening in said cup, a plug mounted on said arm and adapted to engage the underside of said cup and to cover the opening therein, said arm being pivotally mounted on said frame at a point laterally offset from said cup opening for swinging said plug selectively towards and away from said cup bottom, and spring means acting on said arm for urging said plug into engagement with said cup bottom.

References Cited in the file of this patent

UNITED STATES PATENTS

| 29,897 | Mason | Sept. 4, 1860 |
| 81,914 | Linderman | Sept. 8, 1868 |
| 134,293 | Kneisly | Dec. 24, 1872 |
| 277,260 | Free | May 8, 1883 |
| 292,852 | Regar | Feb. 5, 1884 |
| 338,852 | Macomber | Mar. 30, 1886 |
| 923,023 | Cranwell et al. | May 25, 1909 |
| 1,312,320 | Grenier | Aug. 5, 1919 |
| 1,507,516 | Richardson | Sept. 2, 1924 |
| 1,640,528 | Bruhn | Aug. 30, 1927 |
| 2,103,111 | Ekdahl | Dec. 21, 1937 |
| 2,337,276 | Sanchis | Dec. 21, 1943 |
| 2,515,594 | Fischman | July 18, 1950 |
| 2,623,660 | Warren | Dec. 30, 1952 |
| 2,644,614 | Tanko et al. | July 7, 1953 |
| 2,678,216 | Gandrud | May 11, 1954 |

FOREIGN PATENTS

| 186,697 | Switzerland | Dec. 16, 1936 |